United States Patent
Abujbara et al.

(10) Patent No.: US 7,926,092 B2
(45) Date of Patent: Apr. 12, 2011

(54) FACILITATING THE DELIVERY OF SECURITY CREDENTIALS TO A NETWORK DEVICE

(75) Inventors: Nabil M. Abujbara, Irvine, CA (US); Abhijit B. Rao, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 997 days.

(21) Appl. No.: 11/380,813

(22) Filed: Apr. 28, 2006

(65) Prior Publication Data

US 2007/0255945 A1    Nov. 1, 2007

(51) Int. Cl.
*H04L 29/06* (2006.01)
*H04L 29/08* (2006.01)

(52) U.S. Cl. .............................. 726/5; 726/6

(58) Field of Classification Search ............... 726/5, 6
See application file for complete search history.

(56) References Cited

U.S. PATENT DOCUMENTS

| | | | |
|---|---|---|---|
| 2005/0108369 A1* | 5/2005 | Sather et al. | 709/220 |
| 2005/0108546 A1 | 5/2005 | Lehew et al. | |
| 2005/0125693 A1 | 6/2005 | Duplessis et al. | |
| 2005/0149204 A1 | 7/2005 | Manchester et al. | |
| 2006/0059545 A1* | 3/2006 | Stanforth | 726/4 |
| 2007/0079113 A1* | 4/2007 | Kulkarni et al. | 713/150 |

* cited by examiner

*Primary Examiner* — Jason K Gee
(74) *Attorney, Agent, or Firm* — Canon U.S.A., Inc., IP Division

(57) ABSTRACT

A method and system for enabling devices to join secure networks without requiring the devices to be aware of any particular security credential delivery mechanism or to implement multiple security credential delivery mechanisms.

31 Claims, 5 Drawing Sheets

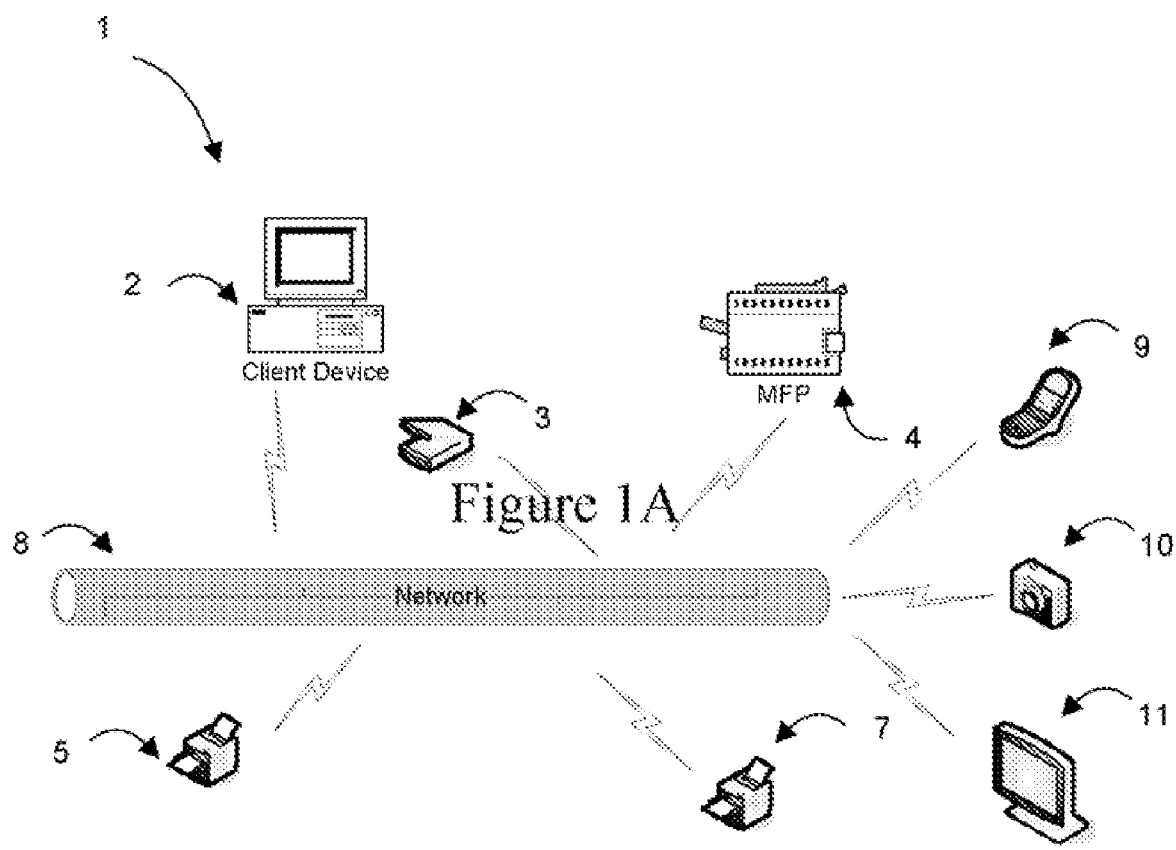

SCRM – Security Credential Reception Module
SCEU – Security Credential Extraction Utility

FACILITATING THE DELIVERY OF SECURITY CREDENTIALS TO A NETWORK DEVICE

BACKGROUND OF THE INVENTION

1. Field of the Invention

The present invention relates generally to enabling a device to easily join a secure network. More specifically, the present invention relates to a method and system for enabling a wireless device to easily join a secure network.

2. Description of the Related Art

The use of wireless devices such as notebooks, personal data assistants (PDAs), IP-enabled mobile phones, printers, cameras, displays, projectors, etc. has recently become more and more commonplace in the work environment, public locations (i.e., hotspots), and the home environment. In many instances, the networks that these wireless devices are connecting to are wireless networks, which can be a Local Area Network (e.g., 802.11), Cable Replacement Network (e.g., UWB), and Metropolitan Area Network (e.g., 802.16).

In many cases, these networks are also secure networks. Typically, in order for a wireless device to access a secure network, the wireless device must obtain the "secret" security credentials required in order for the secure network to recognize the wireless device as a trusted member of the network.

Currently, providing/delivering security credentials to devices without user interfaces (UIs) or whose UIs are not user friendly (e.g., printers, digital cameras, projectors, media players, network storage devices, etc.) is often very difficult and requires additional hardware and software resources. Even in the case of devices with user friendly UIs, the task of entering the security credential information can become very burdensome on the user. Specifically, users are required to manually enter security credential related information, which is often very cryptic in nature. For non-technically savvy users, this can be a very confusing and frustrating experience. Additionally, users often forget the "secret" credential(s) they originally used when setting up the secure network for the first time. Without knowing these credentials they can not add new devices to the secured network.

In an attempt to address the issue of providing/delivering security credentials, several different Security Credential Delivery Mechanism (SCDM) methods have been implemented to secure networks. For example, Microsoft®'s Windows® Connect Now (WCN), Broadcom®'s SecureEasySteup™ (SES), and Buffalo®'s AirStation OneTouch Secure System™ (AOSS™). More SCDM methods are likely to be developed/defined in the future in an attempt to improve the security credential delivery user experience.

Problems exist with the current SCDM methods. Some still require a user to manually enter cryptic credential information. Others require that the device being added to the network support, in hardware, the necessary features associated with a particular method and to also implement, in software, the technology specific protocol that will enable the device to obtain the security credential information. For example, WCN requires devices to provide a USB host port for the insertion of a USB flash drive (UFD) to carry and deliver the security credential information. SES and AOSS™ require the devices to add a hardware switch to be pressed to start the security credential delivery operation, and a light emitting diode (LED) to indicate the status of the security credential delivery operation.

In addition, because each method is different, device manufactures would have to build their devices to that they would be able to join a secure network regardless of the SCDM being used. In there words, the device would need to support multiple SCDMs. Implementing multiple SCDMs on a device would add additional complexity in terms of such things as user interface, protocol development, testing, and additional hardware required to support the various SCDMs. This would in turn add to the cost of the device without guaranteeing that the device will be compatible with new SCDM methods which have not been defined at the time the device was manufactured.

What is needed is a method of adding wireless devices to secured networks without requiring that the devices be aware of the specifics of each SCDM and having to take on the additional overhead of supporting multiple SCDMs.

SUMMARY OF THE INVENTION

The foregoing problem is addressed by providing a method and system for consistently delivering security credentials to a wireless device for joining a secure network regardless of the SCDM used by the particular secure network. More specifically, the present invention provides a method and system for adding a device to a secured network comprising establishing a communication link between a client device already a member of the secured network and the device to be added to the secure network, obtaining unique identification information about the device to be added to the secure network, impersonating the device to be added to the secure network, obtaining security credential information on behalf of the device to be added to the secure network, and transferring the security credential information to the device to be added to the secure network, wherein the device to be added to the secure network is added to the secure network using the security credential information, and wherein the device to be added to the secure network is "security credential delivery mechanism" independent or supports a security credential delivery mechanism different from the security credential delivery mechanism currently being used by the secure network.

Further features of the present invention will become apparent from the following description of exemplary embodiments (with reference to the attached drawings).

BRIEF DESCRIPTION OF THE DRAWINGS

FIG. 1A is a representational view of the general configuration of an exemplar system of the present invention.

DESCRIPTION OF THE EMBODIMENTS

Figure 1B:
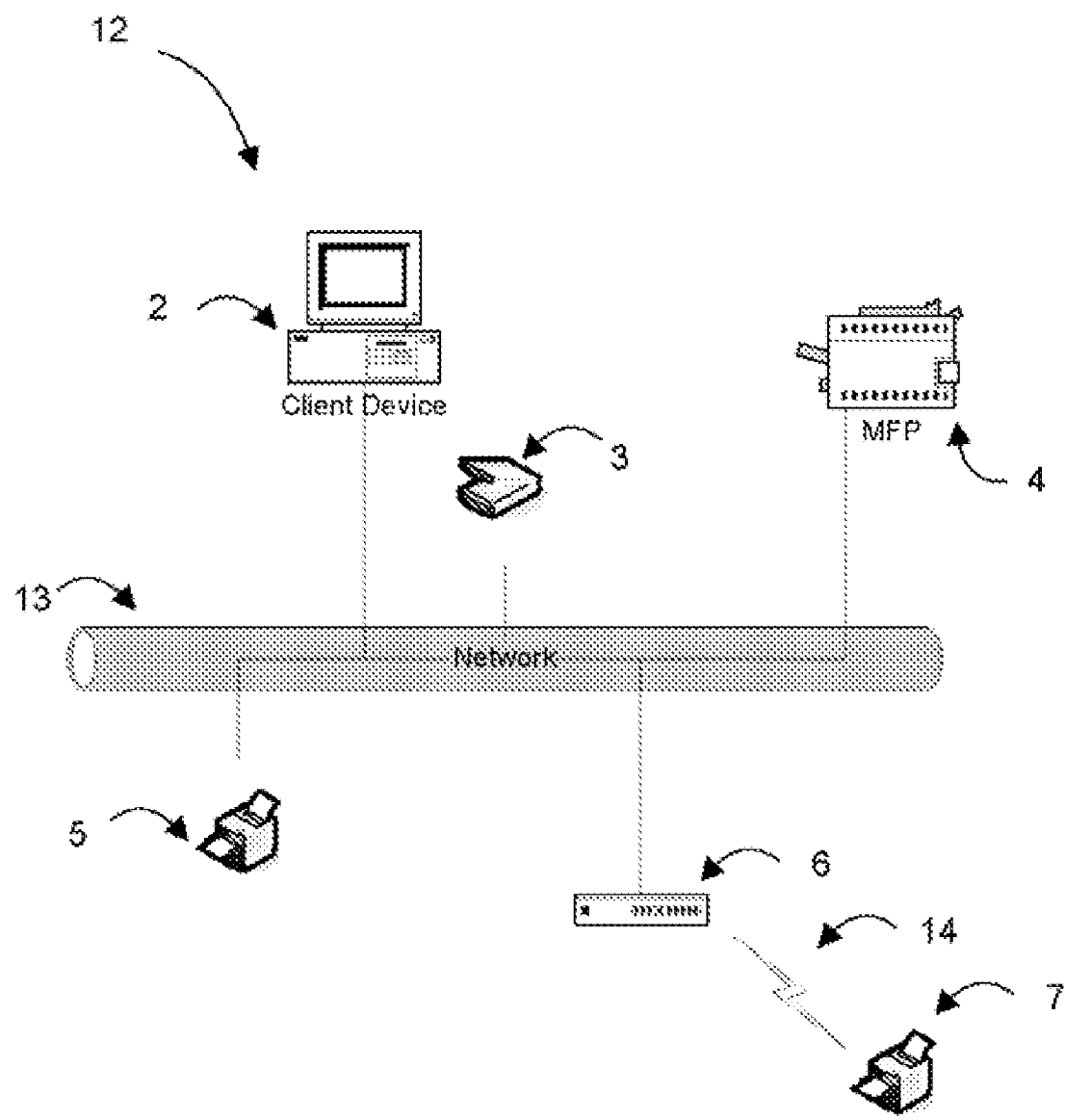
FIG. 1B is a representational view of the general configuration of another exemplary system of the present invention.

Exemplary embodiments of the present invention are described herein with reference to the accompanying drawings. It is to be understood that the description is not intended to limit the invention to the exemplary embodiments, and that the invention is intended to cover alternatives, equivalents, and modifications included within the scope of the appended claims.

The present invention allows a wireless device to join a secure network without requiring that the wireless device be aware of any particular SCDM or to implement multiple SCDMs. More specifically, the present invention shifts the burden of detecting and selecting the appropriate SDCM to an already trusted network client, where the network client delivers the security credentials to the wireless device desiring to join the secured network in a consistent and secure method regardless of the SCDM used by a particular secure network.

FIG. 1A is a representational view of an exemplary system 1 in which the present invention is implemented. System 1 includes a trusted client device 2, a scanner 3, a multi-function peripheral (MFP) 4, a printer 5, another printer 7, a cell phone 8, a digital camera 10, and a display 11. All of the devices, except for printer 7, are directly connected to each other via a network 8, where network 8 is a secure wireless network. Printer 7 is a device that needs to be added to the network 8.

FIG. 1B is a representational view of another exemplary system 12 in which the present invention is implemented. Whereas network 8 in FIG. 1A is a wireless network, network 13 of FIG. 1B is a hybrid network containing wired and wireless interfaces. Network 14 between access point 6 and printer 7 is a secure network.

Please note that for the purposes of the following discussion, system 1 will be refereed to, and trusted client device 2 is a personal computer. However, any type of network and trusted client device, such as a personal data assistant (PDA), smart display, etc., that would enable practice of the present invention are applicable.

Figure 2:
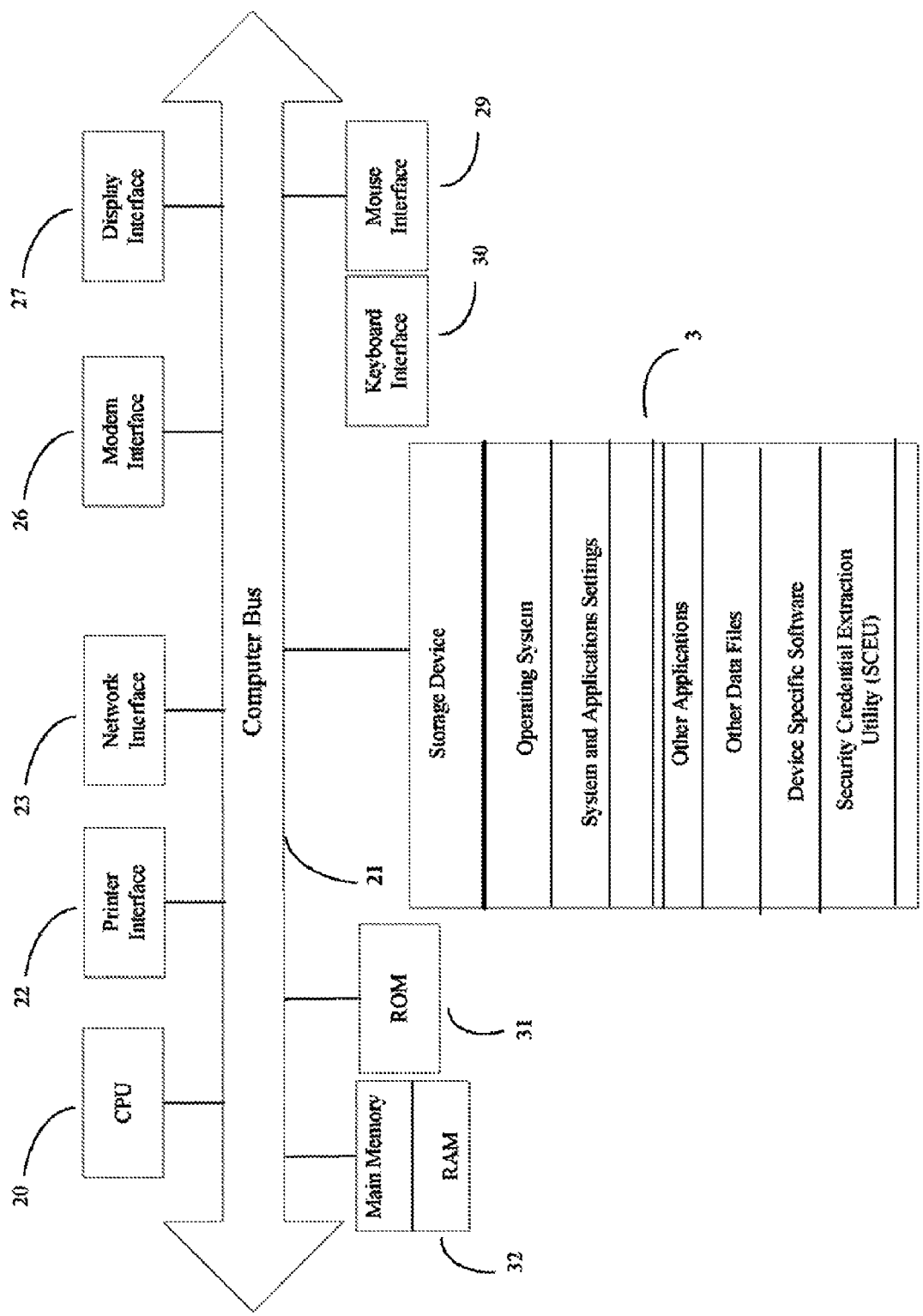
FIG. 2 is a block diagram illustrating the internal architecture of a client device utilizing the process of delivering security credentials according to the present invention

FIG. 2 is a block diagram of the internal architecture of trusted client device 2, which utilizes the process of delivering security credentials according to the present invention. Shown in FIG. 2 is CPU 20, which can be any type of microprocessor, which interfaces to computer bus 21. Also interfacing with computer bus 21 are printer interface 22, allowing trusted client device 2 to communicate with a local printer (not shown), network interface 23 enabling communication between trusted client device 2 and network 8, modem interface 26 to enable communication between trusted client device 2 and its internal modem (not shown), display interface 27 for interfacing with a display monitor (not shown), keyboard interface 30 for interfacing with a keyboard (not shown), and mouse interface 29 for interfacing with a mouse (not shown).

Read only memory (ROM) 31 stores, among other things, invariant computer-executable process steps for basic system functions such as basic I/O, start-up, or reception of keystrokes from a keyboard. Main random access memory (RAM) 32 provides CPU 20 with memory storage that can be accessed quickly.

Also shown in FIG. 2 is storage device 3, which includes an operating system, web browser, which is executable on a particular operating system, and other applications which may include word processing, spreadsheet, and graphics. Storage device 3 further includes data files and software associated with a particular device. Storage device 3 also includes trusted client device's 2 system and applications settings, which may contain information regarding the particular SCDM(s) used by trusted client device 2 to join network 8, as well as a Security Credential Extraction Utility (SECU) (discussed in further detail below).

Figure 3:
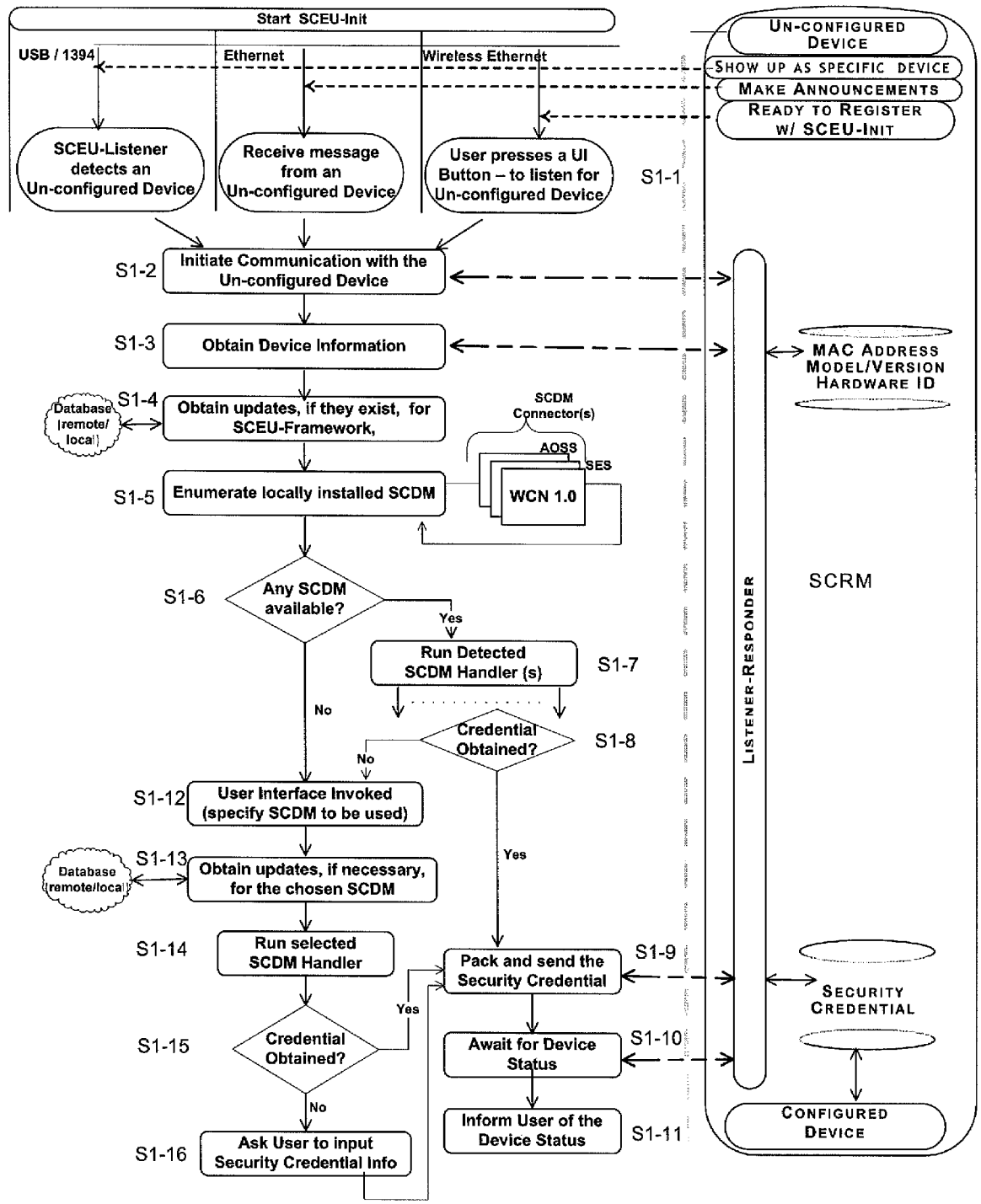
FIG. 3 is a flow diagram illustrating exemplary processing of the present invention performed between a client device and a device to be added to a secure network.

FIG. 3 is a flow diagram illustrating exemplary processing of the present intention performed by a trusted client device and an exemplary illustration of the interaction between the trusted client device and a device to be added to a secure network (i.e., un-configured device). The processing shown in FIG. 3 allows an un-configured device to join a secure network regardless of the SDCM being used by the secure network. In other words, the illustrated process allows a device to join a secure network where the un-configured device is not required to be aware of a particular SCDM, i.e., the device is SCDM independent. In addition, the illustrated process also allows a device that supports one type of SCDM to join a secure network that utilizes another type of SCDM.

For the purposes of describing FIG. 3, trusted client device 2 will be the trusted client device, printer 7 will be the un-configured device being added to the secure network, and network 8 will be the secure network. Please note that any client device, such as computer (desktop or laptop), personal data assistant (PDA), smart display, etc., and any device, such as a scanner, printer, multi-function peripheral, digital copier, digital camera, mobile telephone, display, etc., and any type of network, wired or wireless, that would enable practice of the present invention are applicable.

Briefly, as shown in FIG. 3, trusted client device 2 includes an Interface Manager (hereinafter referred to as a Security Credential Extraction Utility or SCEU) while printer 7 includes a Security Interface Module (hereinafter referred to as a Security Credential Reception Module or SCRM). The SCEU establishes a communication link with printer 7, and obtains unique identification information about printer 7, such as network interface MAC addresses, type of network interface, model name, etc., from the printer's 7 SCRM.

The SCEU then impersonates printer 7 and participates in the process of obtaining security credential information on behalf of printer 7. Finally, the SCEU transfers the security credential information to the printer's 7 SCRM, where the transfer can occur either via a wired or wireless interface. The data transfer occurs over a secure channel, wherein establishing the secure channel is done using method(s) well-known in the art.

The SCEU includes a framework (hereinafter referred to as SCEU framework) that provides a mechanism for plugging in multiple different SCDMs.

More specifically, the SCEU is first installed on trusted client device 2, which is already a trusted member of network 8. Typically, the SCEU would be included as part of the software associated with plainer 7 that is installed on or embedded in trusted client device 2.

First, in step S1-1, the SCEU is notified of the existence of printer 7. Notification can occur in several ways. In one embodiment, printer 7 is a USB device, and the SCEU is notified using existing plug-and-play events when printer 7 is connected to trusted client device's 2 local USB port. In another embodiment, printer 7 is a wired Ethernet device, and the SCEU installs a listener on a predetermined network port, where printer 7 is expected to transmit messages to listeners on this port. In still yet another embodiment, printer 7 supports a wireless interface (e.g., 802.11 a/b/g/n, UWB, WiMax, etc.), and the SCEU provides a user interface button that a user selects to indicate that printer 7 should listen for special wireless protocol frames from trusted client device 2. Notification is not limited to the above-described methods, and any method that would enable practice of the present invention is applicable.

After trusted client device 2 is notified of the existence of printer 7, in step S1-2, the SCEU's responder module is involved to communicate with printer's 7 SCRM. More specifically, responder module obtains device information from the SCRM. Next, in step S1-3, the SCEU's core unit receives the device information and then in step S1-4 checks whether there are any updates to the SCEU framework as well as any related components. This is done to ensure that the latest SCEU framework is utilized, in case additional SCDMs or other SCEU capabilities have been implemented since printer 7 was manufactured.

Next, in step S1-5, the SCEU framework enumerates any locally installed SCDMs on trusted client device 2. Then, in step S1-6, a check is made whether any SCDMs are available on network 8 and detectable from trusted client device 2. If no SCDMs are available, the SCEU's user interface module is invoked as described below. If however, any SCDMs are available, then in step S1-7, the corresponding handlers for the detected SCDMs are run in trusted client device's 2 SCEU as separate threads.

In step S1-8, check is made whether any security credentials were obtained after the detected SCDM handlers were run. If no security credentials were obtained, flow proceeds to step S1-12 described below. If any security credentials were obtained, flow proceeds to step S1-9, where the security credentials that were obtained are passed to the SCRM.

Next, in step S1-10, the SCEU waits for device status to be provided by printer 7 confirming the successful reception of the security credential information and ability to join network 8. Upon receipt of any device status, the SCEU proceeds to provide the status to the user in step S1-11.

If no security credential information is obtained in step S1-8, then in step S1-12, the SCEU's user interface module is invoked. When the SCEU's user interface module is invoked, the module notifies the user either that no SCDM was available or that no security credential was obtained. In addition, the user is prompted to input/select a particular SCDM which the user believes is being used by the user's network. Next, in step S1-13, the SCEU checks whether there are any updates for the chosen SCDM(s).

In step S1-14, the SCEU, based on the user's input, attempts to run the selected SCDM handler to obtain security information. If no security credential is obtained, then in step S1-16, the user is prompted to manually provide the security credential information on the trusted network client user interface, which is then passed to the SCRM via steps S1-9 through S1-11 as described above.

If, in step S1-15, a security credential is obtained, the security credential is passed to the SCRM as previously described in steps S1-19 through S1-11.

Figure 4:
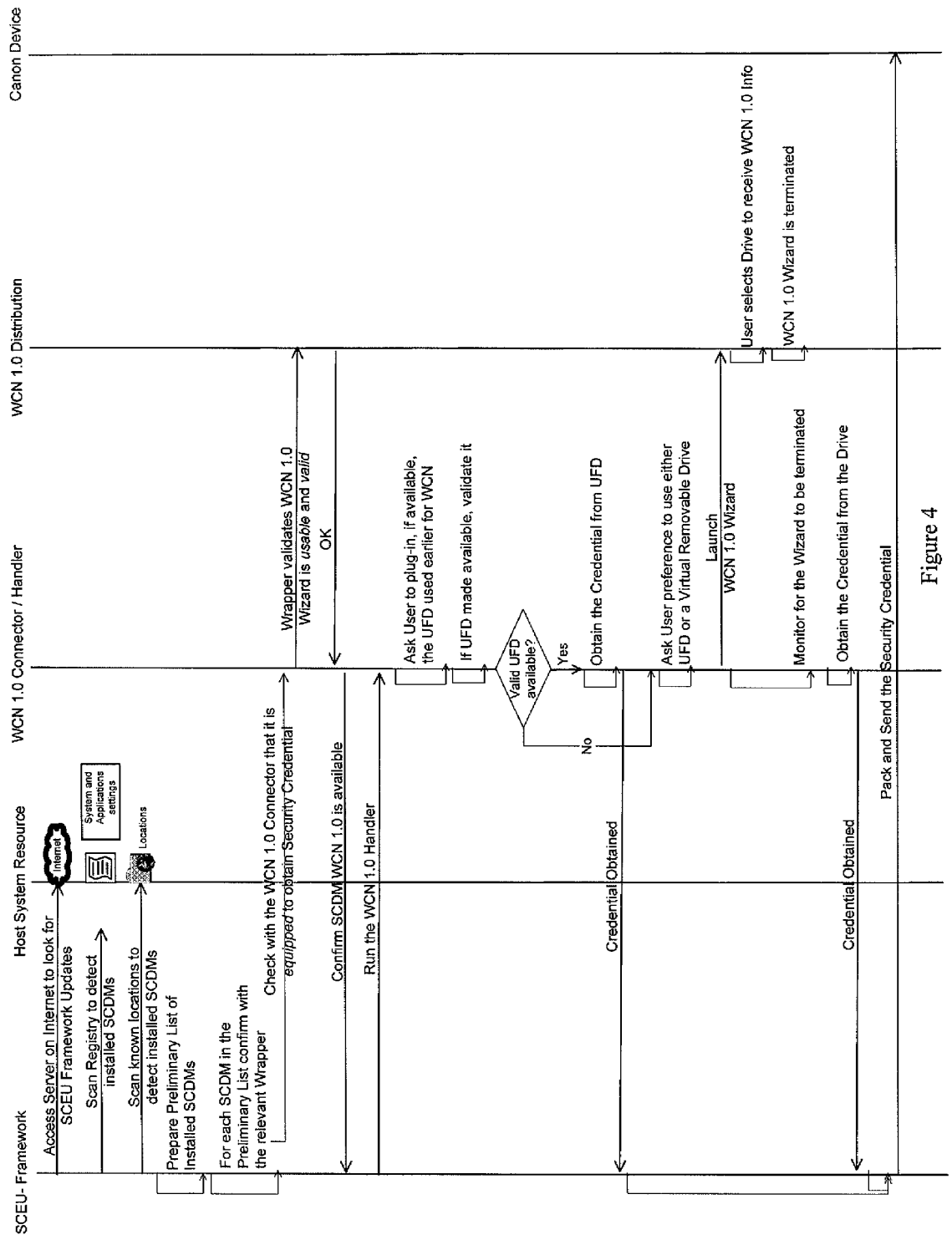
FIG. 4 is a diagram illustrating exemplary processing for enumerating a locally installed security credential delivery mechanism according to the present invention.

FIG. 4 is a diagram illustrating exemplary processing for enumerating a locally installed security credential delivery mechanism (SCDM) according to the present invention. The illustrated example uses Microsoft® Windows® Connect Now 1.0 (WCN 1.0) as the SCDM currently used. Portions of the depicted processing are specific to WCN 1.0, while the remaining portions are part of the present invention and thus, are applicable to enumerating any locally installed SCDM.

First, the SCEU on the trusted client device 2 initially accesses a database on a remote or local server or remote or local network peer to determine if nay SCEU framework updates are available. Following installation of any updates, the SCEU then scans trusted client device's 2 system and applications settings or locations in trusted client device's 3 memory where SCDMs are typically stored to detect any SCDMs installed on trusted client device 2. If any installed SCDMs are detected, a list of these SCDMs is created.

For each SCDM in the list, a determination is made whether the SCDM is available. If it is available, the corresponding handler for the SCDM is then run. For example, if it is determined that WCN 1.0 is available, the user can then be prompted to plug-in, if available, a USB flash drive, and then the USB flash drive is validated. A USB flash drive with the security credential information on it is considered to be valid.

In the implementation of the WCN 1.0 handler, it is not mandatory to request the user for a USB flash drive. Instead, the implementation can behave as though a USB flash drive is not available.

If a valid USB flash drive is available, the security credential is obtained from the USB flash drive. If the USB flash drive does not have valid security credential information, the user is then prompted to either continue using the USB flash drive or a virtual removable drive. If the user selects a virtual removable drive then the SCEU creates it. If the user selects a USB flash drive, then SCEU will verify that USB flash drive is plugged-in. This step is to allow the user to select the drive where the security credential information will be written to. Please note the drive selection is typical to WCN 1.0 only.

If a valid USB flash drive is not available, then the SCEU creates a virtual removable drive and informs the user of the identity string (e.g., drive name) associated with the newly (and temporarily) created remobable drive.

Next, the WCN wizard is launched on the trusted client device 2. The user is prompted to select the drive to receive the security credential information, and then the wizard is terminated. Following termination of the wizard, the security credential is obtained from the drive and passed to the SCEU framework. The security credential is then transmitted to printer 7 using a secure link. Printer 7 should now be able to join network 8 using the acquired security credential information.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A method, performed by an information processing device including a processor, of adding a target device to a secure network, the method comprising:

establishing, using the processor, a communication link between a client device already a member of the secure network and the target device to be added to the secure network, wherein, before the communication link is established, the target device is separate from the secure network and unauthenticated on the secure network;

obtaining, using the processor, security credential information in place of the target device from the secure network at the client device, in response to the establishing of the communication link with the target device, wherein, the security credential information is obtained in place of the target device via the client device already a member of the secure network;

impersonating the target device and participating in the process of obtaining security credential information on behalf of the target device; and transferring, using the processor, the obtained security credential information from the client device to the target device, wherein the target device is added to the secure network using the obtained security credential information, and wherein the target device to be added to the secure network is security credential delivery mechanism independent or supports a security credential delivery mechanism different from a security credential delivery mechanism being used by the secure network.

2. A method according to claim 1, wherein establishing the communication link includes the target device notifying the client device of the existence of the device.

3. A method according to claim 2, wherein notification occurs using plug-and-play events when the target device is connected to the client device.

4. A method according to claim 2, wherein notification occurs by the target device transmitting messages to a predetermined port on the client device.

5. A method according to claim 2, wherein notification occurs by a user selecting a user interface button of the client device, wherein selection of the user interface button indicates that the target device should listen for predetermined wireless frames from the client device.

6. A method according to claim 1, wherein obtaining security credential information includes support for plugging in multiple different security credential delivery mechanisms.

7. A method according to claim 1, further comprising enumerating at least one security credential delivery mechanism previously installed on the client device.

8. A method according to claim 1, wherein transferring the security credential information to the device occurs over a secure communication channel.

9. A method according to claim 1, further comprising invoking a user interface in the event no security credential information is obtained.

10. A method according to claim 9, wherein a user is notified via the user interface that no security credential information was obtained.

11. A method according to claim 9, wherein a user is prompted via the user interface to enter security credential information.

12. A method according to claim 1, further comprising invoking a user interface in the event no security credential delivery mechanism is located.

13. A method according to claim 12, wherein a user is notified via the user interface that no security credential delivery mechanism was located.

14. A method according to claim 13, wherein a user is prompted via the user interface to select a security credential delivery mechanism.

15. A non-transitory computer-readable storage medium storing computer-executable process steps for performing the method according to claim 1.

16. A system for adding a device to a secure network, the system comprising:
a client device, wherein the client device is a member of the secure network;
at least one target device, wherein the target device is separate from the secure network and unauthenticated on the secure network;
the client device comprising:
a communication unit that establishes a communication link between the client device and the at least one target device;
an obtaining unit that obtains security credential information in place of the target device from the secure network, in response to the establishing of the communication link with the target device,
wherein, the security credential information is obtained in place of the target device via the client device already a member of the secure network,
the client device impersonating the target device and participating in the process of obtaining security credential information on behalf of the target device;
a transfer unit that transfers the obtained security credential information to the at least one target device;
the at least one target device comprising:
a communication unit that provides identification information of the target device; and
a receiving unit that receives security credential information from the client device,
wherein the at least one target device is added to the secure network using the obtained security credential information, and
wherein the at least one target device is security credential delivery mechanism independent or supports a security credential delivery mechanism different from a security credential delivery mechanism being used by the secure network.

17. A system according to claim 16, wherein the at least one target device notifies the client device of the existence of the target device.

18. A system according to claim 16, wherein notification occurs using plug-and-play events when the target device is connected to the client device.

19. A system according to claim 16, wherein notification occurs by the target device transmitting messages to a predetermined port on the client device.

20. A system according to claim 16, wherein notification occurs by a user selecting a user interface button of the client device, wherein selection of the user interface button indicates that the target device should listen for predetermined wireless frames from the client device.

21. A system according to claim 16, wherein the obtaining unit includes support for plugging in multiple security credential delivery mechanisms.

22. A system according to claim 16, wherein the client device further comprises an enumeration unit that enumerates at least one security credential delivery mechanism previously installed on the client device.

23. A system according to claim 16, wherein the client device transfers the security credential information to the target device via a secure communication channel.

24. A system according to claim 16, wherein the client device further comprises an interface unit that provides a user interface in the event no security credential information is obtained.

25. A system according to claim 24, wherein a user is notified via the user interface that no security credential information was obtained.

26. A system according to claim 24, wherein a user is prompted via the user interface to enter security credential information.

27. A system according to claim 16, wherein the client device further comprises an interface unit that provides a user interface in the event no security credential delivery mechanism is located.

28. A system according to claim 27, wherein a user is notified via the user interface that no security credential delivery mechanism was located.

29. A system according to claim 27, wherein a user is prompted via the user interface to select a security credential delivery mechanism.

30. A non-transitory computer-readable storage medium storing computer-executable process steps for performing the functions of the client device according to claim 16.

31. A non-transitory computer-readable storage medium storing computer-executable process steps for performing the functions of the target device according to claim 16.

* * * * *